C. W. FAILOR
July 29, 1930. RAILWAY TRAFFIC CONTROLLING APPARATUS Re. 17,752
Original Filed July 19, 1928
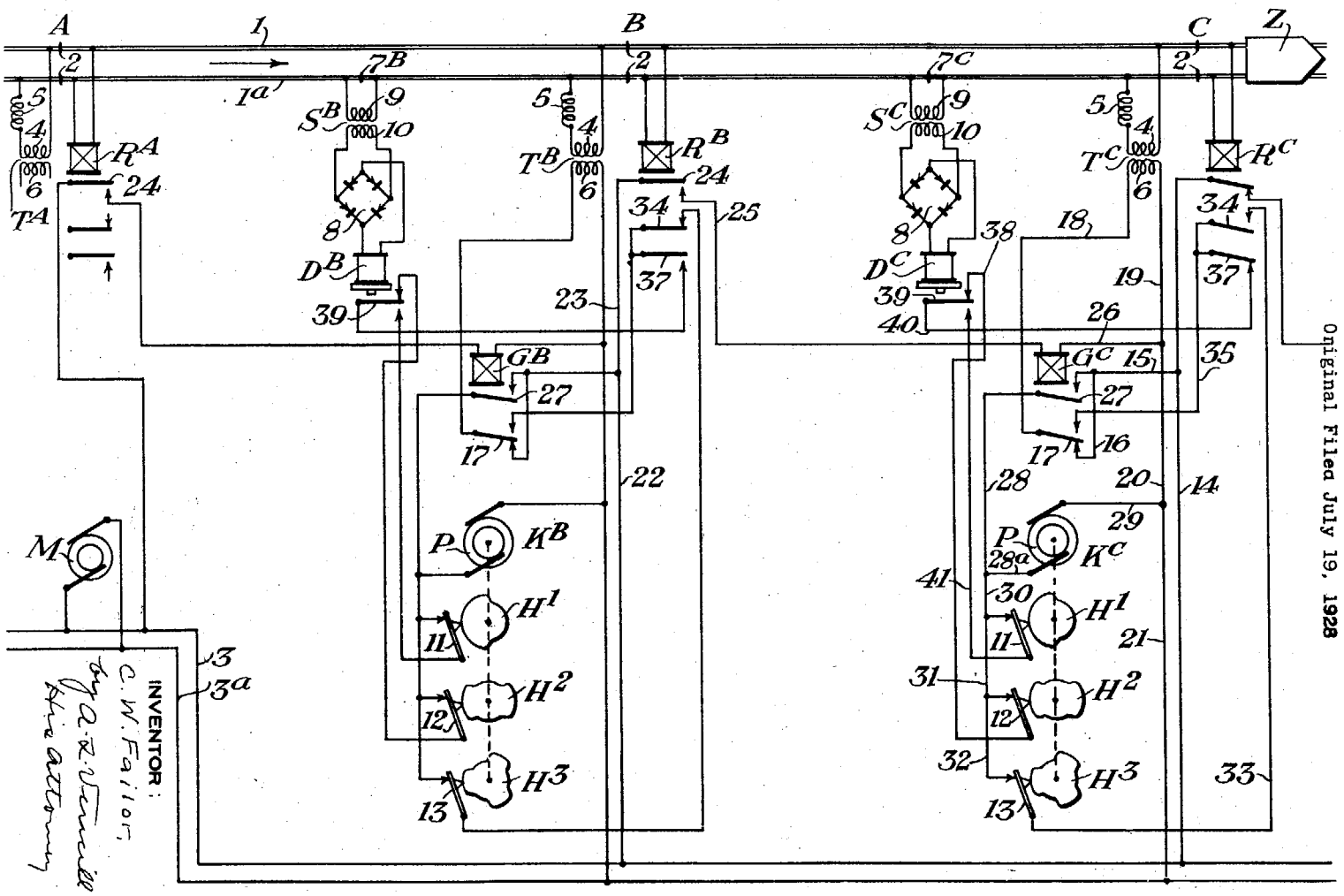

Reissued July 29, 1930 Re. 17,752

UNITED STATES PATENT OFFICE

CHARLES W. FAILOR, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY-TRAFFIC-CONTROLLING APPARATUS

Original No. 1,718,736, dated June 25, 1929, Serial No. 294,029, filed July 19, 1928. Application for reissue filed March 25, 1930. Serial No. 438,849.

My invention relates to railway traffic controlling apparatus, and particularly to apparatus of the type comprising train carried governing means controlled by energy received from the trackway. More particularly my present invention relates to the trackway portion of such apparatus.

I will describe one form of trackway apparatus embodying my invention, and will then point out the novel features thereof in claims.

The accompanying drawing is a diagrammatic view illustrating one form of apparatus embodying my invention.

Referring to the drawing, the reference characters 1 and $1^a$ designate the track rails of a stretch of railway track over which traffic normally moves in the direction indicated by the arrow. These rails are divided by means of insulated joints 2 to form a plurality of successive track sections A—B, B—C, etc. Each track section is provided with a track relay, designated by the reference character R with an exponent corresponding to the location, and connected across the rails adjacent the entrance end of the section. Each section is also provided with a source of track circuit current, here shown as a track transformer, designated by the reference character T with a suitable exponent, and having its secondary 4 constantly connected across the rails adjacent the exit end of the corresponding section in series with the usual impedance 5. The primary 6 of each track transformer T is at times supplied with alternating current as will be described hereinafter from a suitable source of energy such as an alternator M over line wires 3 and $3^a$. An insulated joint, designated by the reference character 7 with an appropriate distinguishing exponent, is located in one rail $1^a$ of each section at a point somewhat in rear of the exit end of the section. Associated with each of the joints 7 is a transformer designated by the reference character S with an exponent corresponding to the location and having one winding 9 connected with the rails on opposite sides of the corresponding joint 7. The secondary 10 of each transformer S is connected through a full wave rectifier 8 with the winding of a slow acting direct current relay which is designated by the reference character D with an appropriate distinguishing exponent. It will be plain, therefore, that the alternating current supplied to the rails of each section by the corresponding track transformer, flows through the rails of the section in series and through the windings of the track relay R and winding 9 of transformer S. The alternating current thus supplied to each transformer S energizes the corresponding relay D.

Each track section is further provided with an approach relay, designated by the reference charactered G with a distinguishing exponent, and arranged to be energized when the associated track relay is deenergized. Referring particularly to relay $G^C$, this relay is provided with a circuit which may be traced from line wire 3, through wires 22 and 23, back contact 24 of relay $R^B$, wire 25, winding of relay $G^C$, and wires 26, 20 and 21, back to line wire $3^a$. Since relay $R^B$ is energized when section B—C is unoccupied, it follows that the approach relay $G^C$ is normally deenergized, but that this relay is energized when a train occupying section B—C deenergizes relay $R^B$.

Associated with each approach relay G is a coding device, designated in general by the reference character R with an appropriate distinguishing exponent, and comprising a motor P which operates a plurality of code wheels here shown as three in number and designated by the reference characters $H^1$, $H^2$ and $H^3$. Each code wheel $H^1$ operates a contact 11 so that when the code wheel is rotated the contact is alternately opened and closed. In similar manner, the code wheel $H^2$ operates contact 12 so that this contact is periodically opened and closed when the code wheel is rotated. Finally, each code wheel $H^3$ actuates a contact 13 in such manner that the contact is periodically operated in response to rotation of the code wheel. It will be observed that the code wheels $H^1$, $H^2$ and $H^3$ of each coding device K have different numbers of swells so that when the coding device is operated, the contacts 11, 12 and 13 are periodically operated at different frequencies. Each coding device K is controlled by the associated approach relay G in such manner that the coding device is operated when the approach relay is energized. For example, when relay $G^C$ becomes energized, current flows from line wire 3, over wires 14 and 15, front contact 27 of relay $G^C$, wires 28 and $28^a$, motor P and wires 29 and 21 to line wire $3^a$.

Referring now particularly to section B—C, when the section is unoccupied, the approach relay $G^C$ is deenergized as was described hereinbefore. Under these conditions, current flows from line wire 3, through wires 14, 15 and 16, back contact 17 of relay $G^C$, wire 18, primary 6 of transformer $T^C$ and wires 19, 20, and 21 to line wire $3^a$. Under normal conditions, then, the primary 6 of transformer $T^C$ is supplied with uninterrupted alternating current so that track relay $R^B$ is energized and relay $D^C$ is also energized. When section B—C is occupied by a train, however, so that relay $G^C$ is energized, the coding device $K^C$ is operated and current is then supplied to the primary of transformer $T^C$ over a selected one of the contacts of the coding device $K^C$, depending upon traffic conditions. For example, if relay $R^C$ is energized, the circuit for transformer $T^C$ may be traced from line wire 3, through wires 14 and 15, front contact 27 of relay $G^C$, wires 28, 30, 31 and 32, contact 13 of coding device $K^C$, wire 33, front contact 34 of relay $R^C$, wire 35, front contact 17 of relay $G^C$, wire 18, primary 6 of transformer $T^C$, and wires 19, 20 and 21 to line wire $3^a$. When this circuit is closed, alternating current supplied to the rails of section B—C is periodically varied at the frequency of operation of contact 13, and this current I will hereinafter term the "proceed code". If relay $R^C$ is deenergized, however, the circuit just traced is broken, and if relay $D^C$ is energized, current flows from line wire 3, through wires 14 and 15, front contact 27 of relay $G^C$, wires 28, 30 and 31, contact 12 of coding device $K^C$, wire 38, front contact 39 of relay $D^C$, wire 40, back contact 37 of relay $R^C$, wire 35, front contact 17 of relay $G^C$, wire 18, primary 6 of transformer $T^C$ and wires 19, 20 and 21, to line wire $3^a$. When this circuit is closed, the current supplied to section B—C is periodically varied at the frequency of operation of contact 12 and this current I will hereinafter term the "caution code". If relays $D^C$ and $R^C$ are both deenergized, however, the circuit just traced is open and the circuit for transformer $T^C$ then passes from line wire 3, over wires 14 and 15, front contact 27 of relay $G^C$, wires 28 and 30, contact 11 of coding device $K^C$, wire 41, back contact 39 of relay $D^C$, wire 40, back contact 37 of relay $R^C$, wire 35, front contact 17 of relay $G^C$, wire 18, primary 6 of transformer $T^C$, and wires 19, 20 and 21, to line wire $3^a$. The current then supplied to section B—C is periodically varied at the frequency of operation of contact 11 of coding device $K^C$ and this current I shall hereinafter term the "slow code". The supply of current to each of the remaining sections is controlled in the same manner as has already been explained in connection with section B—C.

Before explaining the operation of the apparatus as a whole, it should be pointed out that the trackway apparatus herein shown and described is suitable for, though in no way limited to, use with train carried governing means responsive to current in the track rails. In at least one form of apparatus of the type described, the train carried governing means is arranged to display a proceed indication when the track rails occupied by the train are supplied with the proceed code from a point in advance of the train. In similar manner, a caution indication is displayed on board the train when the rails are supplied with the caution code, and a slow indication is received on the train if the rails are supplied with the slow code.

As shown in the drawing, the section to the right of point C is occupied by a train indicated diagrammatically at Z, so that track relay $R^C$ is deenergized. Section B—C is unoccupied and relay $R^B$ is energized so that relay $G^C$ is deenergized. It follows that device $K^C$ is at rest and that the alternating current supplied to the rails of section B—C is uninterrupted. Relay $D^C$ is therefore energized. In similar manner, section A—B is unoccupied, so that relays $R^A$ and $D^B$ are energized and relay $G^B$ is deenergized. The coding device $K^B$ is at rest and uninterrupted alternating current is supplied to primary 6 of transformer $T^B$ over back contact 17 of relay $G^B$.

I will now assume that a train travelling in the direction indicated by the arrow traverses the stretch of track shown in the drawing. When this train enters section A—B, relay $R^A$ becomes deenergized, thereby picking up relay $G^B$ and setting the coding device $K^B$ into operation. Since relay $R^B$ is energized, current is supplied to the primary 6 of transformer $T^B$ over front contact 34 of relay $R^B$, and contact 13 of coding device $K^B$, so that the proceed code is supplied to the rails of section A—B. Each impulse of the current thus supplied to the rails, energizes relay $D^B$ and due to the slow-acting characteristics of this relay, it holds its front contacts closed during the interval between such impulses. The train therefore receives a proceed indication. When the train passes the insulated joint $7^B$, current from transformer $T^B$ is shunted away from primary 9 of transformer $S^B$ and relay $D^B$ then opens. This has no effect upon the rest of the apparatus, however, since the supply of current to transformer $T^B$ is now controlled independently of relay $D^B$. When the train enters section B—C, the consequent deenergization of relay $R^B$ picks up relay $G^C$ and sets device $K^C$ into operation. Since relay $R^C$ is now deenergized, the caution code is supplied to the rails of section B—C over contact 12 of coding device $K^C$, back contact 37 of relay $R^C$ and front contact 39 of relay $D^C$. It should be pointed out that when the train is between point B and insulated joint $7^C$, relay $D^C$ remains in its energized condition so that a caution indication is displayed on board the train. When the train passes insulated joint $7^C$, however, relay $D^C$ is deenergized, and the circuit for transformer $T^C$ is then shifted, by the closing of back contact 39 of relay $D^C$ to contact 11 of coding device $K^C$. As a result, the slow code is supplied to the rails of section B—C and a slow indication is received on board the train. It will be seen, therefore, that the train receives a proceed indication throughout section A—B, that the train receives a caution indication between point B and insulated joint $7^C$, and that the train receives a slow indication from insulated joint $7^C$ to point C.

When the train moves out of section A—B, the next impulse of alternating current supplied to the rails of section A—B energizes relay $R^A$, thereby picking up this relay and deenergizing relay $G^B$ to stop the coding device $K^B$. Furthermore, the closing of back contact 17 of relay $G^B$, restores the supply of uninterrupted alternating current to the rails of section A—B for holding relay $R^A$ closed and for picking up relay $D^B$. The operation of the apparatus as the train moves out of section B—C will be understood from the foregoing without further explanation.

In actual practice, it is customary to arrange the apparatus on the train so that when the indication received from the trackway changes from caution to slow, an automatic application of the brakes will result unless the engineman takes some deliberate action to forestall such application. In systems of this type the insulated joint $7^B$ may conveniently be located at braking distance in rear of the exit end of the corresponding section. Under these conditions, an automatic application of the brakes will be incurred at insulated joint 7 in rear of the occupied section and the train will be brought to a full stop short of the occupied section unless the engineman forestalls such application of the brakes.

It will be manifest from the foregoing description that with apparatus embodying my invention, I have provided trackway circuits which permit a change of indication in a coded train control system at an intermediate point in the section without providing a full cut at such point, that is, without interposing insulated joints in both rails at such point.

Although I have herein shown and described only one form of railway traffic controlling apparatus embodying my invention, it is understood that various changes and modifications may be made therein within the scope of the appended claims without departing from the spirit and scope of my invention.

Having thus described my invention, what I claim is:

1. In combination, a section of railway track, an insulated joint in one rail of the section, a winding connected across said joint, means for supplying alternating current to the rails adjacent one end of the section, means for at times causing periodic variations in said current, and means controlled by said winding for controlling the frequency of such variations.

2. In combination, a section of railway track, an insulated joint in one rail of the section, a winding connected across said joint, means for supplying alternating current to the rails adjacent one end of the section, and means controlled by said winding for at times periodically varying said current at different frequencies according as said winding is energized or deenergized.

3. In combination, a section of railway track, an insulated joint in said section, a transformer having one winding connected across said joint, a second winding on the transformer, a relay receiving energy from said second winding, means for supplying alternating current to the rails adjacent one end of the section, and means controlled by said relay for at times causing periodic variations in said current.

4. In combination, a section of railway track, an insulated joint in said section, a transformer having one winding connected across said joint, a second winding on the transformer, a relay receiving energy from said second winding, means for supplying alternating current to the rails adjacent one end of the section, means effective when the section is occupied to cause periodic variations in said current, and means for at times controlling the frequency of said variations in accordance with the condition of energization of said relay.

5. In combination, a section of railway track, an insulated joint in said section, a transformer having one winding connected across said joint, a second winding on the transformer, a relay receiving energy from said second winding, means for supplying alternating current to the rails adjacent one end of the section, means effective when the section is occupied to cause periodic variations in said current, and means effective under certain traffic conditions in advance of said section for controlling the frequency of said variations in accordance with the condition of energization of said relay.

6. In combination, a section of railway track, a track relay connected with the rails adjacent one end of the section, means for supplying alternating current to the rails adjacent the other end of the section, an insulated joint in one rail of the section, a winding connected across said joint, means controlled by said track relay for at times causing periodic variations in the current supplied to the rails, and means controlled by said winding for at times controlling the frequency of said variations.

7. In combination, a stretch of railway track, comprising a plurality of track sections, a track relay for each section connected across the rails adjacent the entrance end of the section, means for supplying alternating current to the rails adjacent the exit end of each section, an insulated joint in one rail of each section, a winding connected across each said joint, and means controlled by each said winding and operating when the track relay for the section next in advance is deenergized to cause periodic variations of one frequency in the current supplied to the section when a train occupying the section is on one side of said joint and for causing periodic variations of a different frequency in such current when the train is on the other side of the joint.

8. In combination, a stretch of railway track comprising a plurality of sections, a track relay for each section connected across the rails adjacent the entrance end of the section, means for supplying alternating current to the rails adjacent the exit end of each section, an insulated joint in one rail of each section, a winding connected across each said joint, a slow acting relay receiving energy from each such winding, and means for each section for at times periodically varying the current supplied to said section at one frequency or another depending upon the condition of energization of said relay.

9. In combination, a section of railway track, an insulated joint in one rail of the section, a transformer having a primary connected across said joint, a slow-acting relay, means including a rectifier for supplying energy from the secondary of said transformer to said relay, a coding device having two contacts which are periodically operated at different frequencies when a train occupies said section, a transformer having its secondary connected across the rails adjacent one end of said section, means including a front contact of said relay and one of said contacts for at times supplying alternating current to the primary of said transformer, and means for at other times supplying alternating current to said primary over the other said contact and a back contact of said relay.

10. In combination, a section of railway track, a source of track circuit current at the exit end of said section and a main track relay connected across the track rails at the entrance end of said section, an insulated joint in one track rail at an intermediate point in said section, an auxiliary track relay connected with said one rail on opposite sides of said joint, and means controlled jointly by said main track relay and said auxiliary track relay for supplying train governing current to the rails of said section.

11. In combination, a section of railway track, a source of track circuit current at the exit end of said section and a main track relay connected across the track rails at the entrance end of said section, an insulated joint in one track rail at an intermediate point in said section, an auxiliary track relay connected with said one rail on opposite sides of said joint, and means controlled jointly by said track relays for supplying periodically interrupted alternating train governing current to the rails of said section.

12. In combination, a section of railway track, a source of direct track circuit current connected with the rails at the exit end of said section, a main direct current track relay connected across the track rails at the entrance end of said section, an insulated joint in one track rail at an intermediate point in said section, a full-wave rectifier having its input terminals connected with said one rail on opposite sides of said joint, an auxiliary direct current track relay connected with the opposite terminals of said rectifier, and means controlled jointly by said main and auxiliary track relays for supplying periodically interrupted alternating train governing current in the rails of said section.

In testimony whereof I affix my signature.

CHARLES W. FAILOR.